United States Patent
Dietrich et al.

(10) Patent No.: US 6,318,513 B1
(45) Date of Patent: Nov. 20, 2001

(54) ELECTROMECHANICAL BRAKE WITH SELF-ENERGIZATION

(75) Inventors: Johannes Dietrich, Gilching; Bernd Gombert, Grafrath; Markus Grebenstein, München, all of (DE)

(73) Assignee: Deutsches Zentrum fur Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 09/140,285

(22) Filed: Aug. 25, 1998

(30) Foreign Application Priority Data

Apr. 30, 1998 (DE) .............................. 198 19 564

(51) Int. Cl.⁷ .............................. F16D 55/08; F16D 55/16
(52) U.S. Cl. ..................... 188/72.7; 188/72.2; 188/70 B; 188/368; 188/156; 188/162
(58) Field of Search ................................ 188/72.2, 70 B, 188/72.7, 72.8, 342, 343, 368, 369, 156, 162; 303/20, 112

(56) References Cited

U.S. PATENT DOCUMENTS

| | | | |
|---|---|---|---|
| 4,784,244 | * 11/1988 | Carre et al. | 188/156 |
| 4,805,740 | * 2/1989 | Wilke et al. | 303/20 |
| 4,809,823 | * 3/1989 | Fargier | 188/72.7 |
| 4,852,699 | * 8/1989 | Karnopp et al. | 188/72.2 |
| 5,137,126 | * 8/1992 | Magnaval et al. | 188/343 |
| 5,598,144 | * 1/1997 | Lace | 188/111 |
| 5,706,918 | * 1/1998 | Redelman | 188/106 F |
| 5,823,636 | * 10/1998 | Parker et al. | 188/106 F |
| 5,831,530 | * 11/1998 | Lace et al. | 188/111 |
| 6,037,869 | * 3/2000 | Lace | 188/111 |

FOREIGN PATENT DOCUMENTS

| | | |
|---|---|---|
| 3304431 | 8/1984 | (DE) . |
| 3810012 | 10/1988 | (DE) . |
| 19543098 | 12/1996 | (DE) . |
| 19539012 | 1/1997 | (DE) . |
| 19629936 | 11/1997 | (DE) . |
| 2034834 | 6/1980 | (GB) . |
| 58-146723 | 1/1983 | (JP) . |
| 950764 | 2/1996 | (WO) . |
| WO96/03301 | 2/1996 | (WO) . |
| WO98/14715 | 4/1998 | (WO) . |

* cited by examiner

*Primary Examiner*—Robert J. Oberleitner
*Assistant Examiner*—Devon Kramer
(74) *Attorney, Agent, or Firm*—Wood, Herron & Evans

(57) ABSTRACT

An electromechanical brake, in particular for vehicles, has an electric actuator which generates an actuation force and acts on at least one frictional element so as to press the latter, in order to bring about a frictional force, against a rotatable component of the brake which is to be braked. In order to keep the actuation force to be applied by the actuator low, there is, between the component to be braked and the electric actuator, an arrangement which brings about the self-energization of the actuation force generated by the electric actuator. In the event of a deviation between the setpoint value and the actual value, a device for comparing a setpoint value of the frictional force with the actual value of the frictional force controls the electric actuator, in order to correspondingly increase or decrease the generated actuation force, with the result that the actual value is approximated to the setpoint value of the frictional force. Fluctuations in the coefficient of friction thus do not have a disruptive effect.

13 Claims, 2 Drawing Sheets

ELECTROMECHANICAL BRAKE WITH SELF-ENERGIZATION

The present invention relates to an electromechanical brake, in particular for vehicles, having an electric actuator which generates an actuation force and acts on at least one frictional element so as to press the latter, in order to bring about a frictional force, against a rotatable component of the brake which is to be braked.

Electromechanical brakes are known per se. DE 195 43 098 C2 describes a vehicle brake which is designed as a disc brake, can be actuated electrically and whose brake linings can be pressed against the brake disc with the aid of an electric motor. The electric motor transmits its actuation force, via a so-called planetary rolling-contact threaded spindle, onto an axially displaceably mounted piston which interacts with the brake lining.

WO 96/03301 discloses a further vehicle brake which is also designed as a disc brake, can be actuated electrically and whose brake linings can in turn be pressed against the brake disc by means of an electric motor serving as an actuator. The electric motor comprises a spindle gear mechanism and, by means of a spindle element which can be of different designs, is connected, in the direction of displacement of the brake linings, to an axially displaceable piston which acts on a brake lining. In this publication, there is optional provision for the use of an additional gear mechanism for converting the torque and rotational speed.

A major problem with conventional brakes with an electric actuator is the high actuator force which has to be applied in order to achieve a sufficient braking effect. The necessary, high actuator force and the resulting large power demand of the actuator make it necessary to use as drive source very large drive units, usually electric motors, which have large torques, and are also heavy and expensive. The result of this is that electromechanical brakes have, to date, not become widespread as vehicle brakes, for example.

The invention is based on the object of making available an electromechanical brake whose electric actuator has to apply an actuation force which is considerably smaller than that of conventional brakes of this design, so that the brake according to the invention is suitable, for example, for use in motor vehicles or else in railbound vehicles. Moreover, the brake according to the invention is intended to have a very good control response, a high dynamic performance, in particular, being important in this context.

This object is achieved, according to the invention, on the basis of an electromechanical brake of the type mentioned at the beginning and by virtue of the fact that between the component to be braked and the electric actuator there is an arrangement which brings about self-energization of the actuation force generated by the electric actuator, and in that there is a device for comparing a setpoint value of a frictional force with the actual value of the frictional force, which device, in the event of a deviation of the actual value from the setpoint value, drives the electric actuator to correspondingly increase or reduce the generated actuation force, and thus approximates the actual value to the setpoint value of the frictional force.

The self-energization arrangement which is used according to the invention and which increases the actuation force generated by the electric actuator in a purely mechanical way without the introduction of auxiliary forces, the proportion of the actuated force which is necessary to bring about a desired frictional force and which is 100% in conventional electromechanical brakes is drastically reduced. The greatest part of the necessary force is, according to the invention, applied by the self-energization arrangement, so that it is, for example, readily possible to compress the actuation force to be generated by the actuator during normal operation of the brake to approximately 2% of the previously customary value. The power demand of a brake according to the invention drops to the same degree. It is thus possible to use significantly smaller, and thus more light-weight and also cheaper electric motors as actuator, which additionally have the advantage of enhanced dynamics.

So-called self-energizing brakes are known from the prior art, in particular from the field of drum brakes for motor vehicles. Self-energizing brakes have, however, the disadvantage that their coefficient of friction increases disproportionately as the actuator force increases. Since, in conventional hydraulic brake systems, the distribution of the brake force at the individual wheel brake cylinders is determined by the pressure in the brake lines and the area of the hydraulic pistons, the different coefficients of friction which are present in reality between the friction linings of the brake and the brake disc or brake drum to be braked inevitably lead, when self-energizing brakes are used, to great differences in the braking forces at the individual wheels of a vehicle. The driver of the vehicle becomes aware of this because his vehicle pulls into a skewed alignment during braking, i.e. it changes its direction of travel in an undesired way. In particular on a slippery road surface this can lead to the respective vehicle skidding. Because of these disadvantages which are associated with them, self-energizing brakes have therefore no longer been used as a service brake in the field of motor vehicles for some time.

The present invention overcomes the prejudice of the specialist field, which has become established in the course of time, and makes use of the fact that, owing to their multi-element, relatively complex drive train, which comprises an engine and downstream transmission elements, including the associated bearings as well as possibly a gear mechanism in addition, electromechanical brakes generally have a sensor system for measuring force or torque and/or position in order to produce a desired distribution of braking force. This sensor system, which is already present, can, according to the invention be used, without modifications, to carry out the already mentioned setpoint/actual value comparison with respect to the frictional force, so that, when a corresponding difference is detected, for example by an electronic control unit which is coupled to the sensor system, the electric actuator can be driven in order to approximate the actual value of the frictional force to its setpoint value. The actual value of the frictional force can be determined here in a known manner by means of direct or indirect measurement.

Owing to its dynamic performance, which is significantly improved in comparison with conventional electromechanical brakes and which results from the considerably lower actuator forces which have to be applied, the electromechanical brake according to the invention makes it possible to exploit the advantage of a self-energizing arrangement without the previously associated disadvantage, by virtue of the fact that fluctuations in frictional force between a frictional element and the component of the brake which is to be braked are compensated for with such speed that, for example, they no longer adversely affect the driving performance of a motor vehicle.

In preferred embodiments of the brake according to the invention, the self-energizing arrangement has at least one wedge with an angle of inclination $\alpha$ which is supported on an associated abutment in a sliding or rolling fashion.

According to one embodiment, the angle of inclination α is defined in such a way that an input force which is applied to the self-energizing arrangement by means of the electric actuator is, with respect to the customarily prevailing direction of rotation of the component to be braked, always positive irrespective of a changing coefficient of friction between the frictional element and the component to be braked. In this context, mention is also made of a pressure wedge because the dimension of the self-energization is dimensioned by the selection of the angle of inclination α only to be of such a size that, irrespective of a changing coefficient of friction μ, a compressive force has to be exerted on the wedge in all the operating states of the brake, in order to achieve the desired frictional force. The compressive force is applied here by the electric actuator. When such a wedge arrangement under compression is used, the energy requirement of an electromechanical brake according to the invention can, depending on the design, i.e. depending on the selection of the angle of inclination α, be reduced, in normal operation, to 2%, and in fading mode to approximately 17%, of the energy requirement of a conventional electromechanical brake without self-energization.

By the term fading operation here, that state is meant into which a brake goes when an extremely strong braking force is accompanied by a drop in the coefficient of friction owing to temperature-conditioned release of gas from the brake linings. So-called brake fading occurs in motor vehicle brakes in particular after repeated successive braking operations from a high speed or when making relatively long descents through passes in mountainous terrain.

According to another embodiment of the brake according to the invention, the angle of inclination α is selected such that an input force which is applied to the self-energization arrangement by means of the electric actuator is always negative, again with respect to the usually prevailing direction of rotation of the component to be braked, irrespective of a change in coefficient of friction between the frictional element and the component to be braked, the entire drive train between the electric actuator and the self-energization arrangement being prestressed in the direction of the negative input force in this embodiment. In contrast to the wedge arrangement under compression mentioned above, in the case of a continuously negative input force the term used is a wedge arrangement under tension, i.e. a tensile force must be exerted on the wedge in each operating state of the brake. This is achieved by appropriate selection of the angle of inclination α, which is smaller than that of a wedge arrangement under compression. The advantage of a wedge arrangement under tension is improved controllability of the brake during normal operation since, in this state, the brake behaves in a more stable fashion owing to the lower boost factor. However, this advantage is achieved at the expense of an energy requirement during normal operation which is relatively high in comparison with that of the wedge arrangement under compression.

With a wedge arrangement under tension in fading mode, the tensile force to be applied drops sharply owing to the gain as a result of the decreasing coefficient of friction μ and, in this state, only very little actuator force is required to generate the necessary frictional force.

Both the wedge arrangement under compression and the wedge arrangement under tension have the advantage that the possibility of a load change occurring in the drive train is excluded over the entire operating range of the brake. However, in order to avoid any load change whatsoever in the drive train it is additionally necessary, in the case of the wedge arrangement under tension, to prestress the drive train as specified.

In a preferred exemplary embodiment of the brake according to the invention, the component to be braked is a brake disc and the self-energization arrangement has a carrier ring which is arranged parallel to, and coaxial with the brake disc, with spacing between them. This carrier ring is provided on its side facing away from the brake disc with a series of wedges which each define a first face with an angle of inclination α to be supported on, in each case, one rotatably mounted bolt.

According to one development of this brake, all the bolts are mounted in an annular bolt carrier, arranged coaxially with respect to the carrier ring, the axes of rotation of all the bolts being aligned at a right angle to the axis of rotation of the brake disc, and the carrier ring and the bolt carrier being rotatable with respect to one another about the axis of rotation of the brake disc. Rotating the bolt carrier and the carrier ring in relation to one another causes the wedges and bolts to run towards one another so that the axial spacing between the carrier ring and the bolt carrier increases as a function of the relative rotation which is performed, and of the angle of inclination α.

The aforesaid carrier ring is advantageously designed as an internal gear as a result of toothing on its inner circumference. The connection between the electric actuator and this internal gear is then preferably produced by means of an output pinion which is in engagement with the aforesaid toothing and can be driven by the electric actuator.

In a preferred embodiment of such a brake according to the invention, which is designed as a disc brake, the annular bolt carrier is arranged fixed in terms of rotation and the carrier ring which is designed as an internal gear can be rotated with respect to the bolt carrier about the axis of rotation of the brake disc by means of the electric actuator. However, as an alternative, the carrier ring can also be of a design which is fixed in terms of rotation, and the bolt carrier can be of rotatable design.

In a brake according to the invention which comprises a carrier ring, preferably a plurality of friction elements are arranged on the side of the carrier ring facing the brake disc, which elements can be pressed axially against the brake disc by means of the wedges present on the other side of the carrier ring. For thermal reasons, a plurality of friction elements arranged at a distance from one another in the circumferential direction of the carrier ring is preferred, but it is also possible to arrange a single, continuous, annular frictional element on the carrier ring if a relatively large friction lining face is required. The frictional elements can either be connected directly to the carrier ring, for example by bonding, or, however, can also be mounted on separate carrier plates which can then preferably also be attached to the carrier ring in an easily replaceable fashion.

The height of each wedge present on the carrier ring advantageously corresponds, in a direction perpendicular to the carrier ring, at least to the desired adjustment travel of the disc brake, i.e. at least to the maximum permissible wear of the friction elements plus a deformation travel which may occur, in the case of maximum loading, on the brake components bearing the friction elements. The adjustment travel can then be applied exclusively by the wedge arrangement.

In a preferred embodiment of the brake according to the invention with a carrier ring, each wedge is arranged immediately adjacent to the preceding wedge in the circumferential direction of said ring. In this way, idle motions are minimized and it becomes advantageously possible to provide on each wedge a second face to be supported on, in each case, one of the rotatably mounted bolts, which face is inclined oppositely to the first face and has an angle of inclination β which is preferably greater than the angle of inclination α. Whereas, in such an arrangement, the faces with the angle of inclination α are used when a vehicle moving in the forward direction is braked, the second faces, which are inclined at the angle of inclination β, are intended for braking the vehicle when it is reversing. An angle of inclination β which is relatively large in comparison with the angle of inclination α shortens, in a space-saving way, the overall length of each wedge and is not disadvantageous when reversing since the braking force which is required here is usually significantly below the braking force required for braking operations when travelling forwards.

In preferred embodiments of the brake according to the invention, the electric actuator is an electric motor, but other drive units are also possible.

An exemplary embodiment of an electromechanical brake according to the invention, which is configured as a disc brake, is explained in more detail below with reference to the enclosed, schematic figures, in which:

FIG. 1 shows, in a three-dimensional representation, a disc brake 10 with a brake disc 12 which can rotate about an axis A and has internal venting here.

Figure 1:
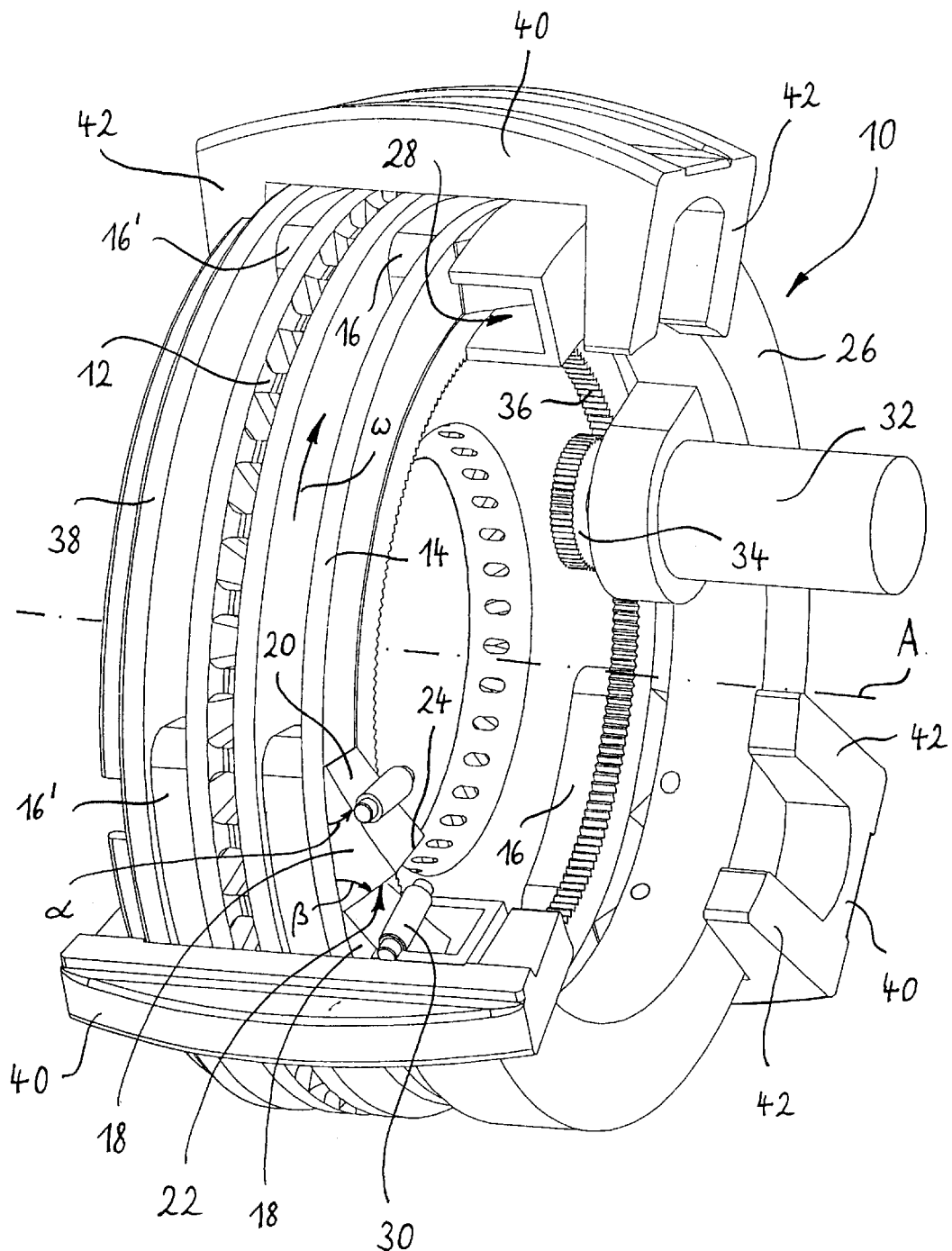
FIG. 1 shows an electromechanical brake according to the invention, configured as a disc brake, in a three-dimensional representation.

A first carrier ring 14 is arranged at a specific axial distance from the brake disc 12, parallel to said disc and coaxial with the axis A, there being mounted on that side of the carrier ring which faces the brake disc 12 a plurality of friction elements 16 which can be applied, in a manner explained in more detail below, against the brake disc 12 in order to generate the frictional force which is necessary to brake the brake disc 12. On the opposite side of the first carrier ring 14, facing away from the brake disc 12, a series of wedges 18 are permanently attached, each of which defines a first face 20 with an angle of inclination α and a second face 22 with an angle of inclination β. In terms of a plan view of the first carrier ring 14, both faces 20, 22 extend directly adjacently to one another, essentially in the circumferential direction of the carrier ring 14. In a modified embodiment (not illustrated here), the two faces 20, 22 do not abut one another at a common edge 24, as illustrated in FIG. 1, but instead have between them a section which extends parallel to the carrier ring 14.

As is clear from FIG. 1, the two faces 20, 22 are inclined oppositely to one another, the angle of inclination β of the second face 22 being significantly greater than the angle of inclination α of the first face 20. The wedges 18, of which, for the sake of better clarity, only some are illustrated in FIG. 1, follow one another directly, viewed in the circumferential direction of the carrier ring 14, so that the total axially outer face of the first carrier ring 14 is covered with wedges 18. However, in other embodiments, which are not illustrated here, there may be a certain distance between two successive wedges 18 in the circumferential direction, and likewise the entire axially outer face of the carrier ring 14 does not need to be covered by wedges 18, but instead the wedges 18 may be arranged, for example, in groups, there being a relatively large distance between two groups of wedges which follow one another in the circumferential direction. The wedges 18 may be formed in one piece with the first carrier ring 14, but they may also be produced as separate parts and then permanently connected to the carrier ring 14.

Arranged axially outside the first carrier ring 14 is an annular bolt carrier 26 with an approximately U-shaped cross-section which defines an annular cavity 28 which is open towards the carrier ring 14 and into which the wedges 18 project. A number of bolts 30, which corresponds to the number of wedges 18 and of which only two are illustrated in FIG. 1, are rotatably mounted in this annular cavity 28. The axes of rotation of the bolts 30 which are provided to interact with the wedges 18 are aligned perpendicularly with respect to the axis A. In the exemplary embodiment illustrated in FIG. 1, each bolt 30 is formed by a sleeve which is rotatably mounted on an axis which is arranged fixed in terms of rotation in the bolt carrier 26.

An electric motor 32 is fastened on the radially inner circumferential face of the bolt carrier 26, serves as an electric actuator for the disc brake 10 and has an output pinion 34 which is in engagement with toothing 36 formed on the radially inner circumference of the first carrier ring 14. If necessary, a gear mechanism (not illustrated) may be arranged between the electric motor 32 and the output pinion 34.

On the side of the brake disc 12 lying opposite the first carrier ring 14 there is arranged, at an axial distance therefrom, a second carrier ring 38, likewise parallel to the brake disc 12 and coaxial with the axis A. This second carrier ring 38 is provided with friction elements 16' on its side facing the brake disc 12, which elements are mounted on the second carrier ring 38 at points which correspond at least essentially to the friction elements 16 and which also bear against the brake disc 12 during the braking process.

Arranged in a radially outer region of the disc brake 10 are a plurality of saddles 40 (three in this case) which engage over the bolt carrier 26, the first carrier ring 14, the brake disc 12 and the second carrier ring 38, and by way of radially inwardly projecting arms 42 are supported, on the one hand, on the axially outer end face of the bolt carrier 26 and, on the other hand, on the axially outer end face of the second carrier ring 38 or an element connected thereto.

The function of the illustrated disc brake 10 will now be explained, it being assumed that the disc brake 12 rotates in the direction of the arrow ω. This direction of rotation corresponds to forward travel in a disc brake 10 installed in a vehicle. In order to initiate a braking operation, the electric motor 32 is energized, and subsequently drives the output pinion 34 in such a way that the first carrier ring 14 rotates through an angle φ in the direction of rotation ω with respect to the bolt carrier 26 which is fixed in terms of rotation. As a result, the first faces 20 of the wedges 18 run up onto the associated bolts 30, causing the first carrier ring 14 to be displaced axially with respect to the brake disc 12, so that the friction elements 16 come to bear against the brake disc 12. The amount s of the axial displacement of the carrier ring 14 is determined here according to the formula $$s = \phi/(2\pi * P)$$

φ being the angle of rotation and P being the inclination of the first face 20 which results from the angle of inclination α.

After the friction elements 16 have been applied to the brake disc 12, the resulting reaction force also brings about an axial displacement of the second carrier ring 38 with respect to the brake disc 12 via the friction elements 16, the first carrier ring 14, the bolt carrier 26 and the saddles 40, with the result that the friction elements 16' are likewise applied to the brake disc 12 (floating caliper principle) virtually without delay.

Figure 2:
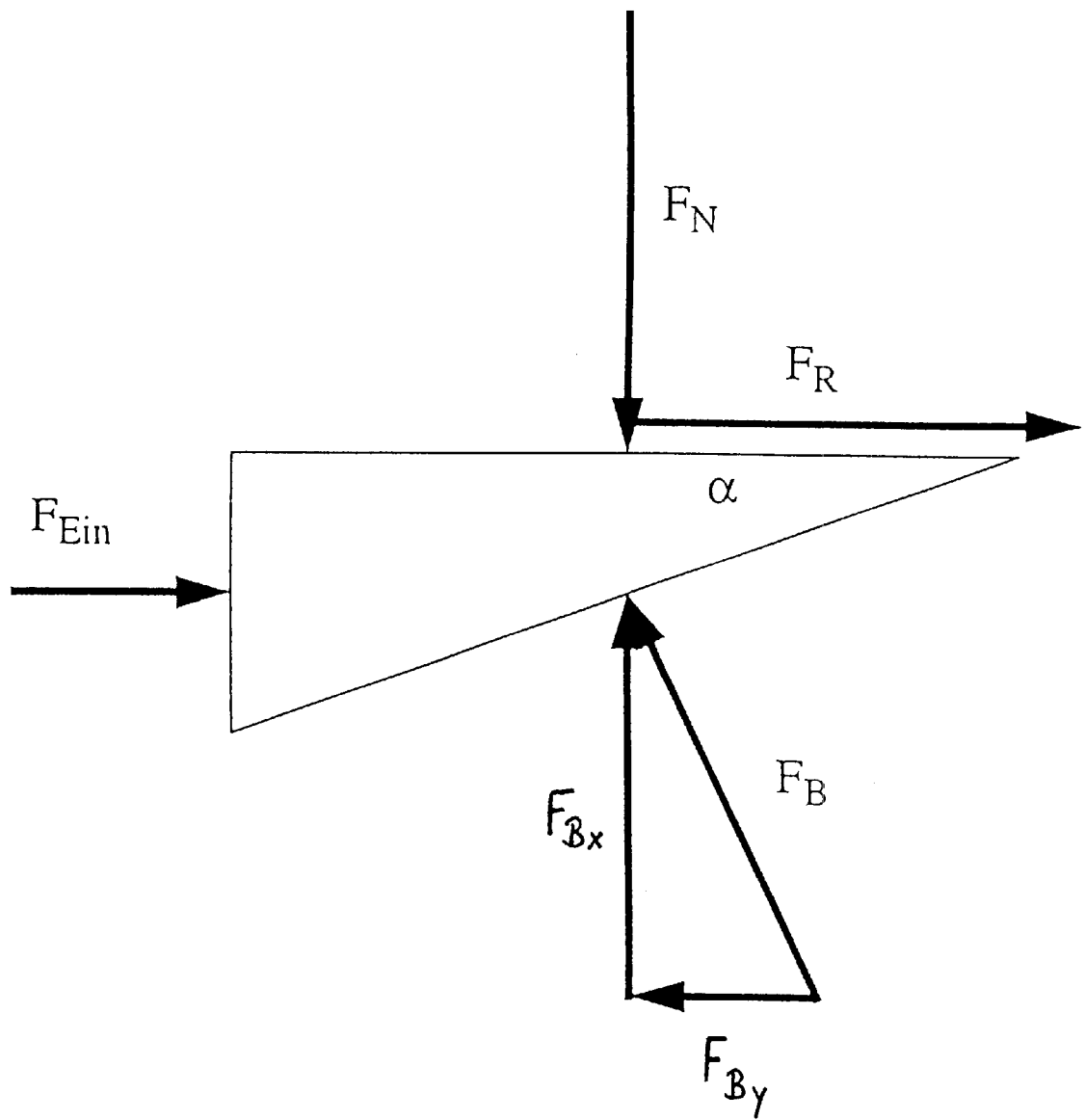
FIG. 2 shows a diagram which represents the forces which act on wedges of the brake illustrated in FIG. 1.

The wedges 18 which interact with the bolts 30 constitute a self-energization arrangement, i.e. the activation force which is applied to the disc brake 10 by the electric motor 32 via the output pinion 34 is automatically boosted without further forces to be applied from the outside. In order to explain the self-energizing effect, the equilibrium of forces is represented on a schematically illustrated wedge 18 in FIG. 2, in which $F_{in}$ is the input force applied to the wedge 18, $F_B$ is the supporting force which results during a braking operation, is to be countered by the bolt 30 and can be divided into a force $F_{Bx}$ which is opposed to the input force $F_{in}$ and a compressive force $F_{By}$ which is perpendicular to the brake disc, $F_N$ is the perpendicular force, opposed to the force $F_{By}$, on the brake disc, and $F_R$ is the frictional force produced at the wedge or at the friction element.

According to this equilibrium of forces, the frictional force or the frictional torque at the brake disc depends, in accordance with the relationship $$F_{in} = -F_R * \left[1 - \frac{\tan\alpha}{\mu}\right]$$

exclusively on the angle of inclination α, the coefficient of friction μ, which represents an interference variable, and the input force $F_{in}$.

The coefficient of friction μ can change to a relatively large degree as a function of the loading of the brake. However, each change in the coefficient of friction during a braking process leads to a change in the frictional force $F_R$, and thus to a changing deceleration of the component of the brake which is to be braked and which is formed above by means of the brake disc 12. In order to compensate for these undesired changes in the coefficient of friction, the illustrated disc brake 10 is provided with a sensor system (not shown) which permits continuous measurement of the frictional force. This sensor system, which is known per se, is connected to an electronic control unit (not illustrated) which evaluates the received signals and, in particular, performs a comparison between a predefined setpoint value of the frictional force and the actual value of the frictional force. As a function of this evaluation of the signals, the electric motor 32 is driven by the control unit in such a way that, by rotating the first carrier ring 14 in the direction of rotation ω, or counter to it, an increase or decrease in the actual value is brought about in order to approximate the actual value to the setpoint value.

A decisive factor for a system to have a good control capability is that the inclination P of the first faces 20 of the wedges 18 is selected such that no load change can occur in the power flux between the electric motor 32 and the wedges 18, specifically neither at the start of braking nor at the point where the brake changes over into so-called fading mode, which occurs when there is high brake loading and a correspondingly hot brake disc 12 and hot friction elements 16, 16'.

The required freedom from load change is fulfilled in that the angle of inclination α is selected such that, with respect to the input force $F_{in}$, either only tensile forces or only compressive forces occur over the entire operating range between the motor 32 and the carrier ring 14, i.e. in that the input force $F_{in}$ remains either positive or else negative over the entire operating range. At specific angles of inclination α, it would, in fact, be possible for the input force $F_{in}$ to change sign owing to the changing coefficient of friction μ, which change would lead to undesired movements in the drive train because the play present in the drive train is then travelled through and, as a result, only force jumps which are difficult to control can occur.

In order to prevent a load change in the drive train, it is necessary to ensure that, in the entire operating range, either the following applies:

$$1 - \frac{\tan\alpha}{\mu} < 0$$

which leads to an input force $F_{in}$ which is positive over the entire operating range, for which reason such an arrangement is also referred to as a wedge arrangement under compression, or that the following applies in the entire operating range:

$$1 - \frac{\tan\alpha}{\mu} > 0$$

which leads to a negative input force $F_{in}$ in the entire operating range, for which reason such an arrangement is also referred to as a wedge arrangement under tension.

If the angle of inclination α is selected such that the input force $F_{in}$ is always negative (wedge arrangement under tension; $F_{By} < F_R$), this has the following consequences:

1. Given a normal coefficient of friction μ of the friction elements, the input force $F_{in}$ to be applied by the electric motor 32 is relatively high, with the result that the energy requirement of the electric motor 32 is, accordingly, relatively high during normal operation. Nevertheless, the energy requirement of the electric motor 32 is then also reduced by up to 80% and more in comparison with a conventional electromechanically activated disc brake.
2. In fading mode, i.e. when the coefficient of friction μ is dropping, the tensile force to be applied by the electric motor 32 decreases in accordance with the above relationships, and consequently, very little engine power and engine torque is required to generate the necessary frictional force $F_R$. In comparison with a conventional arrangement, the energy requirement of the electric motor 32 is thus reduced by more than 95%, depending on which angle of inclination α is selected.

The advantage of a wedge arrangement under tension should be seen as the improved control capability of the brake in normal operation because the system behaves in a more stable fashion owing to the fact that the boost factor is then lower. This advantage is obtained with a somewhat higher energy requirement when the brake is operating normally.

If, on the other hand, the angle of inclination α is selected such that the input force $F_{in}$ is always positive (wedge arrangement under compression; $F_{By} > F_R$), the following results:

1. Given a normal coefficient of friction of the friction elements, the compressive force $F_{in}$ to be applied by the electric motor 32 is theoretically as low as desired. However, in practice, an excessively small value cannot be selected for this compressive force, for reasons of control capability (excessively high boost factor, influence of interference variables etc.). Nevertheless, when the brake is operating normally, the energy required by the electric motor 32 is reduced by 90, 95 and more percent in comparison with a conventional electromechanical brake without a self-energization arrangement.
2. In fading mode, the compressive force $F_{in}$ to be applied by the electric motor 32 rises and, consequently, more engine power and engine torque is required to generate the necessary frictional force $F_R$.

The advantage of such a wedge arrangement under compression is that the electric motor 32, which has to be designed for the relatively high force requirement of the fading mode, has, during normal operation, considerable margins of torque and force, resulting in excellent dynamic properties during normal operation.

In an explanation of the braking process described above by means of the illustrated disc brake 10, a wedge arrangement under compression was used as the basis, i.e. the wedges 18 press against the bolts 30 on the basis of a corresponding rotation of the first carrier ring 14. In a wedge arrangement under tension, the electric motor 32 would have to rotate in the opposite direction, as predefined by the corresponding selection of the angle of inclination α. The device which is necessary in a wedge arrangement under tension in order to prestress the drive train is not illustrated in FIG. 1.

In order to terminate a braking operation which has been initiated, the electric motor 32 is driven in such a way that the output pinion 34 rotates counter to the direction of travel during the activation, with the result that the first carrier ring 14 is moved back into its starting position again, i.e. the first faces 20 of the wedges 18 run up against the bolt 30, and the carrier ring 14 moves axially away from the brake disc 12.

So that, for example, a vehicle can also be braked when reversing, the wedges 18 have the second face 22 with the angle of inclination β. The angle of inclination β of these faces 22 can be selected to be significantly greater than the angle of inclination α of the first faces 20, since particularly high frictional forces are usually not required during reversing. Although the angle of inclination β which is greater than the angle of inclination α results in an increased energy requirement of the electric motor 32 when braking occurs during reverse travel, this fact does not have disadvantageous effects when braking occurs during reversing because normally only a low braking force is necessary.

Therefore, if the brake disc 12 rotates counter to the arrow ω (reverse travel), it being possible to detect the change in the direction of rotation, for example, by means of the sensor system of an ABS system which is usually present these days, the first carrier ring 14 is rotated with the aid of the electric motor 32 to such an extent that the second faces 22 run up onto the bolt 30. The braking process then proceeds as described above.

As an alternative, it is also possible to carry out the braking operation during reverse travel by means of the first faces 20. For this purpose, however, the electric motor 32 must have sufficient force and/or torque reserves (in particular in the case of a wedge arrangement under compression, i.e. with a large angle of inclination α), since the arrangement of wedges 18 and bolts 30 then acts in a self-deenergizing fashion, so that the electric motor 22 must completely apply the necessary frictional force itself.

Although the brake which has previously been explained in more detail is embodied as a disc brake, an embodiment as a drum brake is also possible, it being possible for the wedges 18 then to be arranged, for example, on the radially inner side of the drum brake shoes. Furthermore, the self-energizing effect may be achieved in ways other than with wedges, for example with four-bar linkages.

What is claimed is:

1. Electromechanical brake for vehicles, having an electric actuator which generates an actuation force and acts on at least one frictional element in order to press it, in order to produce a frictional force, against a rotatable component of the brake which is to be braked, wherein between the component which is to be braked and the electric actuator there is an arrangement which brings about self-energization of the actuation force generated by the electric actuator, which self-energization arrangement has at least one wedge with an angle of inclination α which is supported on an associated abutment in a sliding or rolling fashion such that an input force $F_{in}$ which is applied to the self-energization arrangement by means of the electric actuator and a supporting force $F_B$ which results during a braking operation are acting on different surfaces of the wedge, and wherein there is a device for comparing a set point value of the frictional force with the actual value of the frictional force, which device, in the event of a deviation of the actual value from the set point value, drives the electric actuator in order to correspondingly increase or decrease the generated actuation force, and thus approximates the actual value to the set point value of the frictional force.

2. Brake according to claim 1, characterized in that the angle of inclination α is selected such that an input force $F_{in}$ which is applied to the self-energization arrangement by means of the electric actuator is—with respect to the normally prevailing direction of rotation of the component to be braked—always positive irrespective of a changing coefficient of friction μ between the frictional element and the component to be braked.

3. Brake according to claim 1, characterized in that the angle of inclination α is selected such that an input force $F_{in}$ which is applied to the self-energization arrangement by means of the electric actuator is—with respect to the usually prevailing direction of rotation of the component to be braked—always negative irrespective of a changing coefficient of friction μ between the frictional element and the component to be braked, and in that an entire drive train between the electric actuator and the self-energization arrangement is prestressed in the direction of the negative input force $F_{in}$.

4. Brake according to claim 1, characterized in that the component to be braked is a brake disc (12) and in that the self-energization arrangement has a carrier ring (14) which is arranged parallel to and coaxial with the brake disc (12) and is provided on its side facing away from the brake disc (12) with a series of wedges (18) which each define a first face (20) with an angle of inclination α to be supported on, in each case, one rotatably mounted bolt (30).

5. Brake according to claim 4, characterized in that all the bolts (30) are mounted in an annular bolt carrier (26) which is arranged coaxially with respect to the carrier ring (14), the axes of rotation of all the bolts (30) being aligned at right angles to the axis of rotation of the brake disc (12), and the carrier ring (14) and the bolt carrier (26) being rotatable relative to one another about the axis of rotation of the brake disc (12).

6. Brake according to claim 4, characterized in that the carrier ring (14) is designed as a internal gear on its internal circumference by means of toothing (36).

7. Brake according to claim 6, characterized in that a drive pinion (34) which is driven by the electric actuator is in engagement with the toothing (36).

8. Brake according to claim 6, characterized in that the carrier ring (14) can be rotated with respect to an annular bolt carrier (26) about the axis of rotation of the brake disc (12) by means of the electric actuator.

9. Brake according claim 4, characterized in that preferably a plurality of frictional elements (16) are arranged on the side of the carrier ring (14) facing the brake disc (12).

10. Brake according to claim 4, characterized in that the height of each wedge (18) perpendicular to the carrier ring

(14) corresponds at least to the desired adjustment travel of a disc brake (10) which includes the brake disc (12).

11. Brake according to one of claims 4 to 10, characterized in that each wedge (18) directly follows the preceding wedge (18) in the circumferential direction of the carrier ring (14).

12. Brake according to claim 4, characterized in that each wedge (18) defines a second face (22) to be supported on in each case one of the rotatably mounted bolts (30), which face is inclined oppositely to the first face (20) and has an angle of inclination $\beta$ which is preferably greater than the angle of inclination $\alpha$.

13. Brake according to claim 1, characterized in that the electric actuator is an electric motor (32).

* * * * *